United States Patent
Park et al.

(10) Patent No.: US 11,246,096 B2
(45) Date of Patent: Feb. 8, 2022

(54) COMMUNICATIONS APPARATUS AND METHOD USING OOK MODULATION BASED LOW POWER WAKE-UP PROTOCOL

(71) Applicant: KOREA ELECTRONICS TECHNOLOGY INSTITUTE, Seongnam-si (KR)

(72) Inventors: Yongju Park, Goyang-si (KR);
Younghan Kim, Seoul (KR);
Hyunseuk Ahn, Seongnam-si (KR);
Changseok Yun, Gyeonggi-do (KR);
Seungok Lim, Seongnam-si (KR);
Yongseok Lim, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 19 days.

(21) Appl. No.: 16/727,339

(22) Filed: Dec. 26, 2019

(65) Prior Publication Data
US 2021/0168720 A1 Jun. 3, 2021

(30) Foreign Application Priority Data
Nov. 28, 2019 (KR) .................. 10-2019-0155333

(51) Int. Cl.
*H04L 12/28* (2006.01)
*H04W 52/02* (2009.01)
(Continued)

(52) U.S. Cl.
CPC ......... *H04W 52/0235* (2013.01); *H04L 27/04* (2013.01); *H04W 84/18* (2013.01)

(58) Field of Classification Search
CPC ...................................................... H04L 12/28
(Continued)

(56) References Cited

U.S. PATENT DOCUMENTS 10,356,752 B1* 7/2019 Menon .................. H04W 68/02

FOREIGN PATENT DOCUMENTS

JP 4193810 B2 12/2008
KR 10-2014-0022534 A 2/2014
(Continued)

OTHER PUBLICATIONS

Hilal Bello et al., Advances and Opportunities in PassiveWake-Up Radios withWireless Energy Harvesting for the Internet of Things Applications, Sensors, May 29, 2019, 33 Pages, China.
(Continued)

*Primary Examiner* — Dang T Ton
(74) *Attorney, Agent, or Firm* — Hauptman Ham, LLP

(57) ABSTRACT

The present disclosure provides communications apparatus and method using an On-off keying (OOK) modulation based low power wake-up protocol suitable for use in IoT devices. The communication method according to an exemplary embodiment includes: transmitting, by a main radio module of a master device, an OOK modulated wake-up radio signal by using a narrow frequency band between an ISM band and a guard band in the ISM band; receiving, by a low power wake-up radio module of a slave device, the wake-up radio signal and to demodulate according to an OOK modulation scheme and awaken a controller of the slave device in a sleep mode; and after the controller wakes up from the sleep mode, transmitting data to be transmitted to the master device, by the controller of the slave device, through the main radio module.

10 Claims, 9 Drawing Sheets

(51) Int. Cl.
*H04L 27/04* (2006.01)
*H04W 84/18* (2009.01)

(58) Field of Classification Search
USPC .......................................................... 370/329
See application file for complete search history.

(56) References Cited

FOREIGN PATENT DOCUMENTS

KR    10-2016-0065732 A    6/2016
KR    10-2017-0129141 A    11/2017
KR       10-1928400 B1    12/2018
WO       2018/198938 A1    11/2018

OTHER PUBLICATIONS

Korean Office Action dated Jul. 9, 2020, in connection with the Korean Patent Application No. 10-201-0155333.
[Supportive Materials for Exception to Loss of Novelty] Yongju Park et al., Variable Low Power Wake Up OOK modulated signal protocol, Dec. 2019 Telecommunications Technology Association, Republic of Korea, with English Preface.
Korean Notice of Allowance dated Jan. 21, 2021, in connection with corresponding Korean Patent Application No. 10-2019-0155333.
Japanese Office Action dated Aug. 10, 2021, in connection with the Japanese Patent Application No. 2020-112653 with its English Machine Translation.

\* cited by examiner

COMMUNICATIONS APPARATUS AND METHOD USING OOK MODULATION BASED LOW POWER WAKE-UP PROTOCOL

CROSS-REFERENCE TO RELATED APPLICATION

The present application claims priority to Korean Patent Application No. 10-2019-0155333, filed on Nov. 28, 2019, in the Korean Intellectual Property Office, which is incorporated herein in its entirety by reference.

TECHNICAL FIELD

The present disclosure relates to a communications technology for Internet-of-things (IoT) devices and, more particularly, to communications apparatus and method using an On-off keying (OOK) modulation based low power wake-up protocol suitable for use in IoT devices.

BACKGROUND

Conventional wireless communications protocols used in an Industrial, Scientific, and Medical (ISM) frequency band such as Wi-Fi, Bluetooth, or ZigBee protocol include an RF wake-up provisions. However, the conventional RF wake-up technologies have problems of a large standby power consumption in a receiver required for demodulating a received signal in 2.4 GHz carrier frequency and a relatively large power consumption due to a use of multiple carriers.

PRIOR ART REFERENCE

Patent Literature

Korean patent publication No. 10-1928400 published on Dec. 12, 2018, and entitled MULTI PROCESSOR SYSTEM FOR LOW-POWER IOT DEVICE

SUMMARY

Provided are methods and apparatus for communications using an OOK modulation based low power wake-up protocol which can reduce power consumption by awakening an IoT device remaining in a sleep mode only when communications with a master device is necessary.

Additional aspects will be set forth in part in the description which follows and, in part, will be apparent from the description, or may be learned by practice of the presented exemplary embodiments.

According to an aspect of an exemplary embodiment, a communication method includes: transmitting, by a main radio module of a master device, an OOK modulated wake-up radio signal by using a narrow frequency band between an ISM band and a guard band in the ISM band; receiving, by a low power wake-up radio module of a slave device, the wake-up radio signal and to demodulate according to an OOK modulation scheme and awaken a controller of the slave device in a sleep mode; and after the controller wakes up from the sleep mode, transmitting data to be transmitted to the master device, by the controller of the slave device, through the main radio module.

The narrow frequency band may include a frequency range having 5 MHz bandwidth below the ISM band and another frequency range having 5 MHz bandwidth above the ISM band.

The narrow frequency band having 10 MHz bandwidth below and over the ISM band may be divided into ten resource blocks each having 1 MHz bandwidth. One resource block selected among the ten resource blocks may be used for a transmission of the wake-up radio signal.

The wake-up radio signal may include: a preamble modulated according to a modulation scheme supported in a legacy communication system available in the ISM band of 2.4 GHz range; and a payload P that is OOK modulated.

The payload may include: a wake-up preamble indicating that a packet carried by the wake-up radio signal is a wake-up packet; a MAC header containing an address of the slave device; a frame body containing data to be delivered to the slave device; and a frame check sequence containing a sequence for checking and integrity of the packet.

The master device may previously store information on an amount of power required for awakening the slave device.

The master device may transmit the wake-up radio signal a plurality of times until the slave device wakes up.

If the master device transmits the wake-up radio signal to a plurality of the slave devices without designating a specific slave device, the plurality of the slave devices waking up by the wake-up radio signal may communicate with the master device according to an order designated by a communication schedule arranged by the master device.

According to an aspect of another exemplary embodiment, a master device for use in communications includes: a main radio module configured to communicate with a slave device; and a controller configured to control the main radio module to transmit an OOK modulated wake-up radio signal by using a narrow frequency band between an ISM band and a guard band in the ISM band.

The narrow frequency band may include a frequency range having 5 MHz bandwidth below the ISM band and another frequency range having 5 MHz bandwidth above the ISM band. The narrow frequency band having 10 MHz bandwidth below and over the ISM band may be divided into ten resource blocks each having 1 MHz bandwidth, and one resource block selected among the ten resource blocks may be used for a transmission of the wake-up radio signal. The wake-up radio signal may include a preamble modulated according to a modulation scheme supported in a legacy communication system available in the ISM band of 2.4 GHz range; and a payload P that is OOK modulated, The payload may include: a wake-up preamble indicating that a packet carried by the wake-up radio signal is a wake-up packet; a MAC header containing an address of the slave device; a frame body containing data to be delivered to the slave device; and a frame check sequence containing a sequence for checking and integrity of the packet.

According to another aspect of another exemplary embodiment, a slave device for use in communications includes: a slave radio module configured to communicate with a master device in an ISM band; a controller configured to communicate with the master device through the slave radio module when there is any data to be transmitted after waking up from a sleep mode; and a low power wake-up radio module configured to receive an OOK modulated wake-up radio signal transmitted by the master device by using a narrow frequency band between the ISM band and a guard band in the ISM band, demodulate the wake-up radio signal according to an OOK modulation scheme, and awaken the controller of the slave device from the sleep mode.

The narrow frequency band may include a frequency range having 5 MHz bandwidth below the ISM band and another frequency range having 5 MHz bandwidth above the ISM band. The narrow frequency band having 10 MHz bandwidth below and over the ISM band may be divided into ten resource blocks each having 1 MHz bandwidth, and one resource block selected among the ten resource blocks may be used for a transmission of the wake-up radio signal. The wake-up radio signal may include a preamble modulated according to a modulation scheme supported in a legacy communication system available in the ISM band of 2.4 GHz range; and a payload P that is OOK modulated, The payload may include: a wake-up preamble indicating that a packet carried by the wake-up radio signal is a wake-up packet; a MAC header containing an address of the slave device; a frame body containing data to be delivered to the slave device; and a frame check sequence containing a sequence for checking and integrity of the packet.

According to the present disclosure, the use of a wake-up radio signal modulated at a low speed enables to reduce the large standby power and the relatively large power required for the demodulation. Also, due to the use of a variable OOK modulated wake-up radio signal, the system according to the present disclosure may have a structure that can be operated flexibly according to a distance to each station and an amount of power required for each station. In addition, a frequency can be selected flexibly to cope with the distance to the station and communication environments. Moreover, the present disclosure may reduce the power consumption of the IoT devices drastically and improve their device viability by using the wake-up radio signal that is OOK modulated in the narrow frequency band between the ISM band and the guard band in the ISM band.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
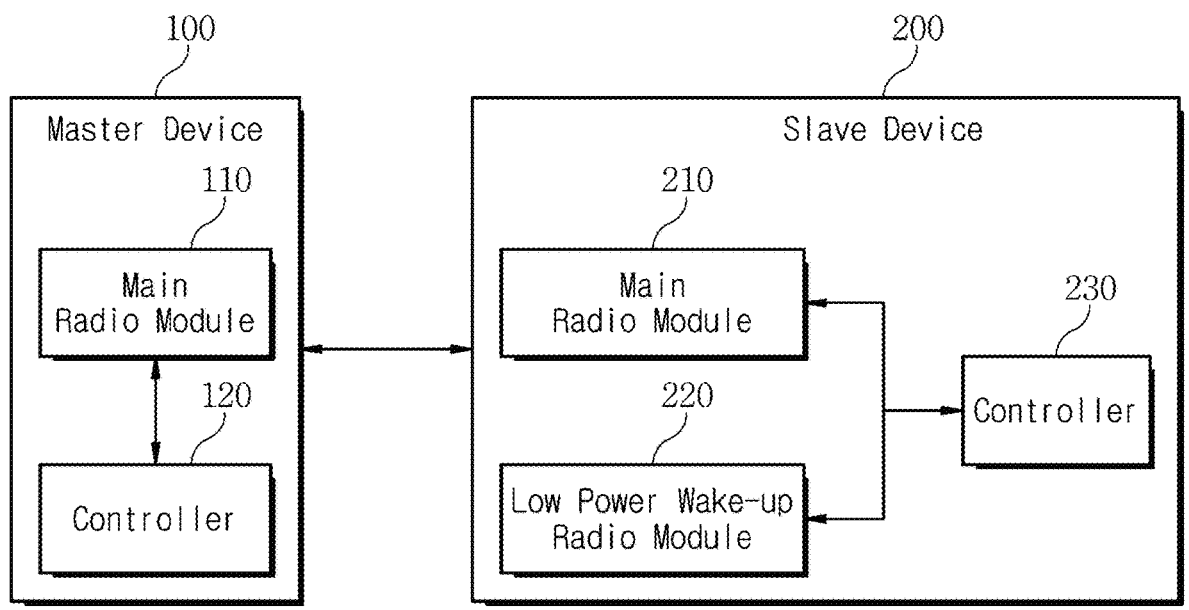
FIG. 1 is a block diagram of a communication system according to an exemplary embodiment of the present disclosure.

The drawings described herein are for illustration purposes only and are not intended to limit the scope of the present disclosure in any way.

DETAILED DESCRIPTION

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure and are not intended to limit the technical idea of the present disclosure. Therefore, it should be understood that there may exist various equivalents and modifications which may substitute the exemplary embodiments at the time of filing of the present application.

For a more clear understanding of the features and advantages of the present disclosure, the present disclosure will be described in detail with reference to the accompanied drawings. It is to be noted that the same components are designated by the same reference numerals throughout the drawings. In the following description and the accompanied drawings, detailed descriptions of well-known functions or configuration that may obscure the subject matter of the present disclosure will be omitted for simplicity. Also, some components in the accompanying drawings may be exaggerated, omitted, or schematically illustrated for the same reason, and the size of each component does not fully reflect its actual size.

FIG. 1 is a block diagram of a communication system according to an exemplary embodiment of the present disclosure. Referring to FIG. 1, a communication system according to an exemplary embodiment of the present disclosure includes a master device 100 and a slave device 200.

The master device 100 is a device for providing a wake-up packet according to an exemplary embodiment of the present disclosure. The master device 100 may be an access point (AP) device, which is a relay device allowing wireless devices to connect to a wired network. The master device 100 includes a main radio (MR) module 110 and a controller 120.

The main radio module 110 generates an On-off keying (OOK) modulated signal to transmit to the slave device 200. The main radio module 110 may generate a wake-up radio (WUR) signal modulated according to an OOK modulation scheme, under the control of the controller 120, to transmit to the slave device 200.

The controller 120 controls the overall operation of the master device 100 including the main radio module 110 and may implemented by a central processing unit (CPU), a microcontroller unit (MCU), or the like.

A slave device (STA) 200 is a device for processing and controlling transmission and reception of data carrying messages through wireless communications. The slave device 200 may be an Internet-of-things (IoT) terminal. The slave device 200 may include a main radio (MR) module 210, a low power wake-up radio (LP-WUR) module 220, and a controller 230.

The low power wake-up radio module 220 is connected to the controller 230 and is in a sleep mode normally but wakes up when the controller 230 enters a sleep mode. The low power wake-up radio module 220 is operable at an ultra low power of 100 µW or less while receiving and demodulating the OOK-modulated wake-up radio signal. Upon receiving the OOK-modulated wake-up radio signal, the low power wake-up radio module 220 wakes up the controller 230 by generating an interrupt signal and providing the interrupt signal to the controller 230.

The main radio module 210 enables the communications between the master device 100 and the slave device 200. In particular, the main radio module 210 may support communications in an Industrial, Scientific, and Medical (ISM) frequency band, according to Wi-Fi, Bluetooth, or ZigBee protocol, for example, between the master device 100 and the slave device 200.

Figure 2:
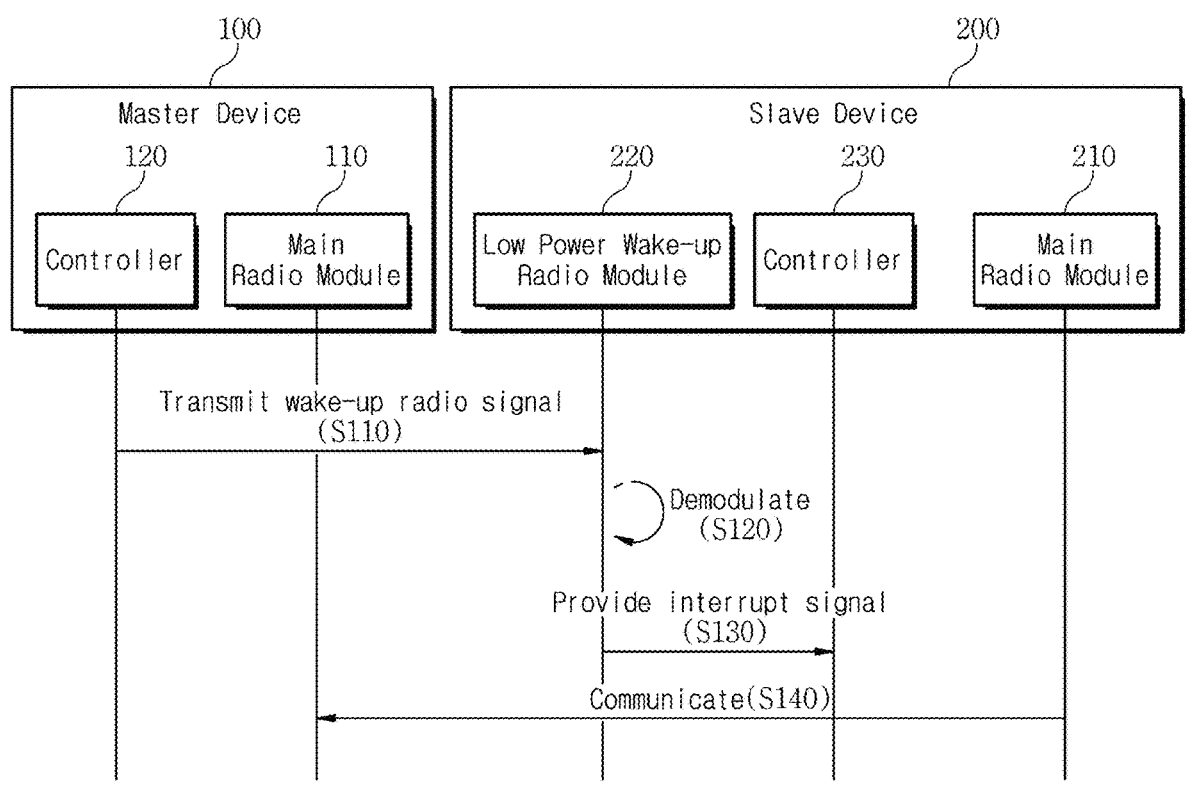
FIG. 2 is a flowchart illustrating a communication method in the communication system according to an exemplary embodiment of the present disclosure.

FIG. 2 is a flowchart illustrating a communication method in the communication system according to an exemplary embodiment of the present disclosure.

In FIG. 2, it is assumed that the slave device 200 initially is in a deep sleep mode, in which only the low power wake-up radio module 220 is awake in the slave device 200. In operation S110, the controller 120 of the master device 100 may modulate a payload portion of a packet according to 62.5 or 250 kbps on-off keying (OOK) scheme to generate the wake-up radio signal, and transmit the wake-up radio signal through the main radio module 110 to wake up the slave device 200.

Even when the slave device 200 is in the deep sleep mode, the low power wake-up radio module 220 of the slave device 200 remains in a wake up radio (WUR) mode to be awake in the deep sleep mode as mentioned above. Upon receiving the wake-up radio signal from the master device 100, the low power wake-up radio module 220 demodulates the payload portion modulated according to the OOK scheme in operation S120.

Subsequently, the low power wake-up radio module 220 wakes up the controller 230 by generating an interrupt signal in operation S130. Accordingly, the controller 230 of the slave device 200 wakes up, and the slave device 200 switches from the deep sleep mode to a communication mode.

After being switched into the communication mode, the controller 230 transmits data through the ISM band according to the Wi-Fi, Bluetooth, or ZigBee protocol through the main radio module 210 when there is any data to be transmitted to the master device 100.

Figure 3:
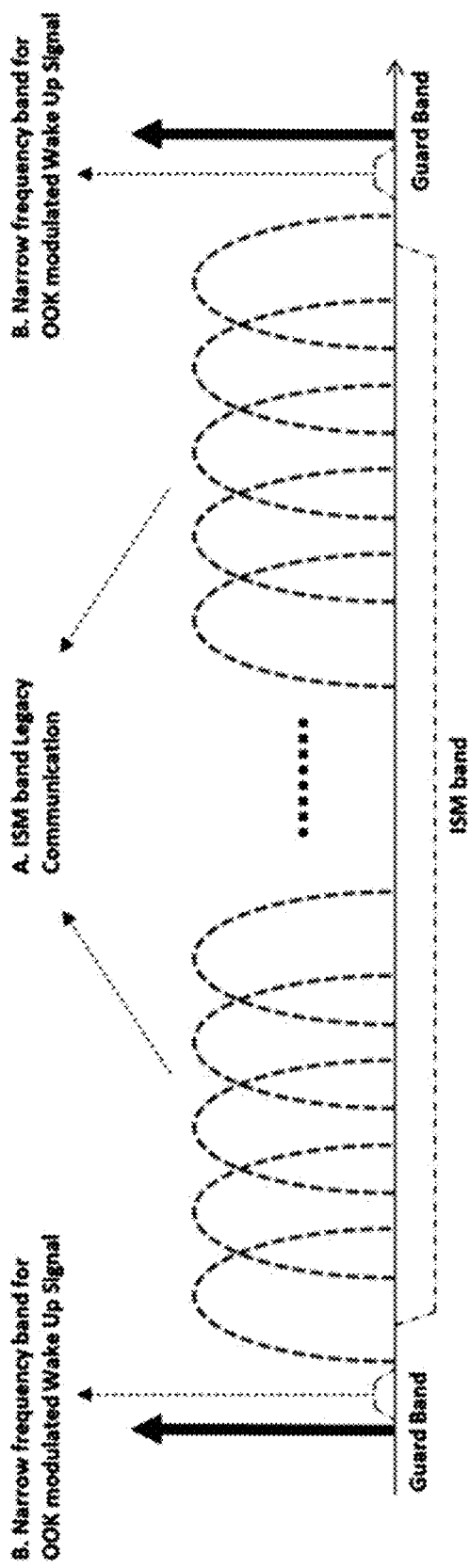
FIG. 3 illustrates an exemplary frequency spectrum showing frequencies of the OOK modulated wake-up radio signal compatible with an ISM legacy communication scheme.

As mentioned above, the controller 120 of the master device 100 transmits, to the slave device 200, the wake-up radio signal in which the payload portion of the packet is modulated according to 62.5 or 250 kbps OKK to wake up the slave device 200. The wake-up radio signal will now be described in more detail with reference to FIG. 3. FIG. 3 illustrates an exemplary frequency spectrum showing frequencies of the OOK modulated wake-up radio signal compatible with an ISM legacy communication scheme.

According to the present disclosure, the master device 100 transmits the wake-up radio signal to the slave device 200 and transmits and receives data to and from the slave device 200. The ISM band in the 2.4 GHz range that is used for the legacy communication scheme such as the Wi-Fi, Bluetooth, and ZigBee is used for the data communications.

Meanwhile, the OOK modulated wake-up radio signal may be transmitted by use of a guard band not being used in the 2.4 GHz ISM range.

More specifically, the main radio module 110 of the master device 100 and the main radio module 210 of the slave device 200 perform data communications using channel frequencies in the ISM band, designated by 'A' in FIG. 3, that supports frequency hopping in the 2.4 GHz band. Also, the main radio module 110 of the master device 100 transmits the OOK modulated wake-up radio signal to the power wake-up radio module 220 of the slave device 200 by using a narrow frequency band 'B' between the guard band and the ISM band. In other words, a narrow frequency range between the ISM band that supports frequency hopping in the legacy communication and the guard band around 2.4 GHz or 2.5 GHz in case of the 2.4 GHz ISM band is used for transmitting the OOK modulated wake-up radio signal.

Figure 4:
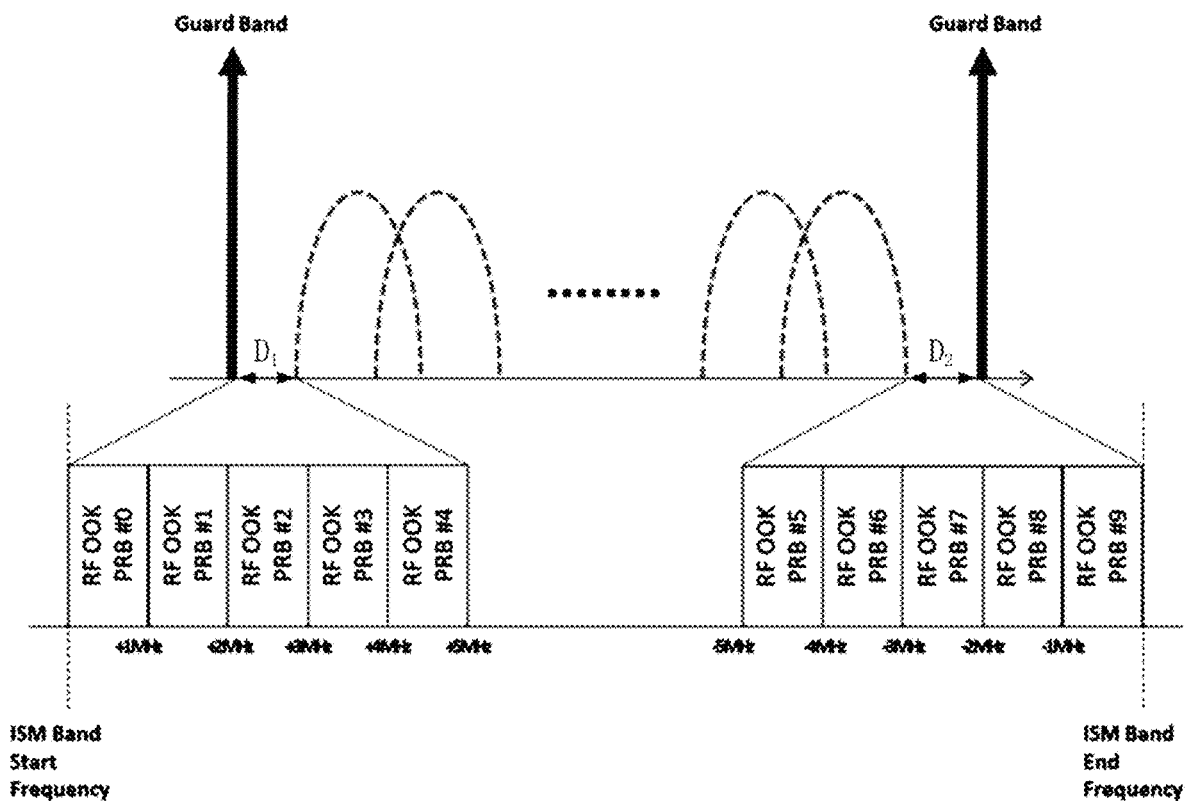
FIG. 4 illustrates a frequency spectrum showing the narrow frequency band used for the OOK modulated wake-up radio signal shown in FIG. 3 in more detail.

Next, an allocation of RF physical resource blocks in the narrow frequency band between the guard band and the ISM band will now be described with reference to FIG. 4. FIG. 4 illustrates a frequency spectrum showing the narrow frequency band used for the OOK modulated wake-up radio signal shown in FIG. 3 in more detail.

The narrow frequency band is used for transmitting the OOK modulated wake-up radio signal, and the bandwidth of the OOK modulated signal may be determined to be 100 kHz or less in consideration of the amount and frequency of the data.

The narrow frequency bands D1 and D2 between the ISM band and the guard bands may include frequency ranges having 5 MHz bandwidth below the ISM band and 5 MHz bandwidth above the ISM band. The narrow frequency bands D1 and D2 may be divided into ten resource blocks, RF OOK PRB #0-RF OOK PRB #9) each having 1 MHz bandwidth. At least one of the resource blocks RF OOK PRB #0 through RF OOK PRB #9 may be used for the transmission of the wake-up radio signal. Thus, the master device 100 may select at least one of the ten resource blocks RF OOK PRB #0 through RF OOK PRB #9 to transmit the wake-up radio signal to the slave device 200. Accordingly, the low power wake-up radio module 220 in the slave device 200 should be configured to have a signal reception sensitivity capable of detecting the wake-up radio signal in the resource block.

Figure 5:
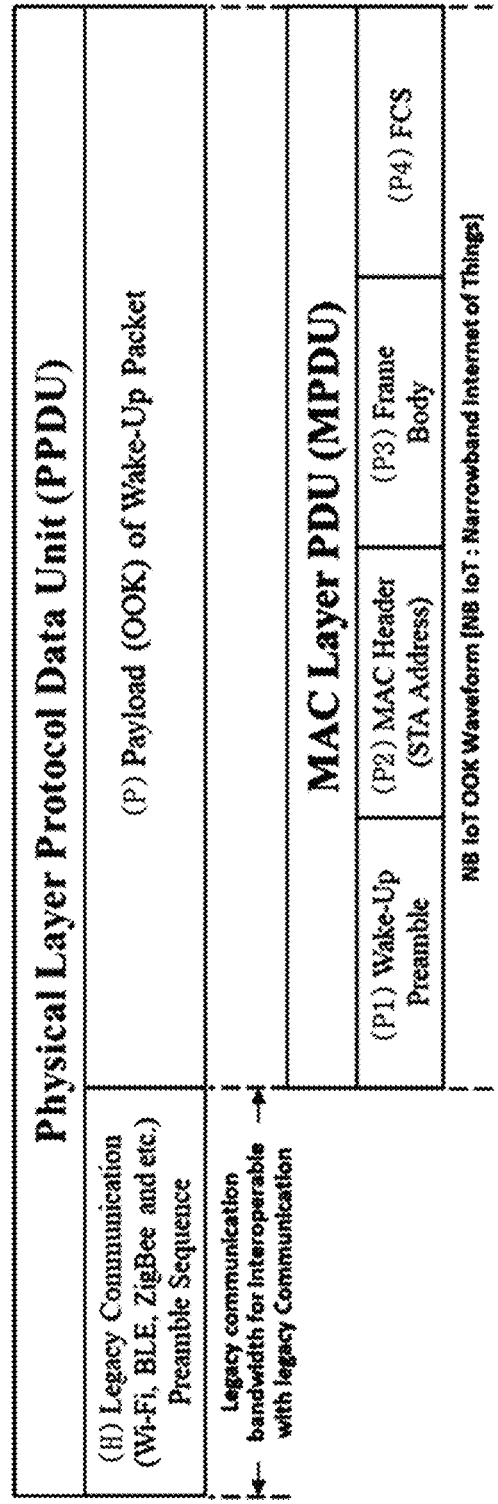
FIG. 5 is illustrates a packet structure according to an exemplary embodiment of the present disclosure.

FIG. 5 is illustrates a packet structure according to an exemplary embodiment of the present disclosure.

Referring to FIG. 5, a physical layer protocol data unit (PPDU) packet according to an exemplary embodiment of the present disclosure has a packet structure compatible with the legacy communication scheme such as the Wi-Fi, Bluetooth, and ZigBee using the ISM band. The PPDU packet may be used for a wake-up packet that is transmitted through the wake-up radio signal as well. The wake-up packet includes a preamble H and a payload P.

The preamble H is modulated by the main radio module 110 according to a modulation scheme supported in the legacy communication system. For example, the preamble (H) may be modulated according to orthogonal frequency-division multiplexing (OFDM), Gaussian frequency-shift keying (GFSK), and the like.

The payload P may be OOK modulated. The payload P may be configured as a media access control (MAC) layer protocol data unit (MPDU) for the transmission of the wake-up packet. The payload P used for the wake-up packet may include a wake-up preamble P1, a MAC header P2, a frame body P3, and a frame check sequence (FCS) P3.

The wake-up preamble P1 indicates that the packet is a wake-up packet carried over the OOK modulated wake-up radio signal. The MAC header P2 contains an address of the slave device 200. The frame body P3 contains data to be delivered to the slave device 200. The frame check sequence P3 includes a sequence for checking the integrity of the packet.

Figure 6:
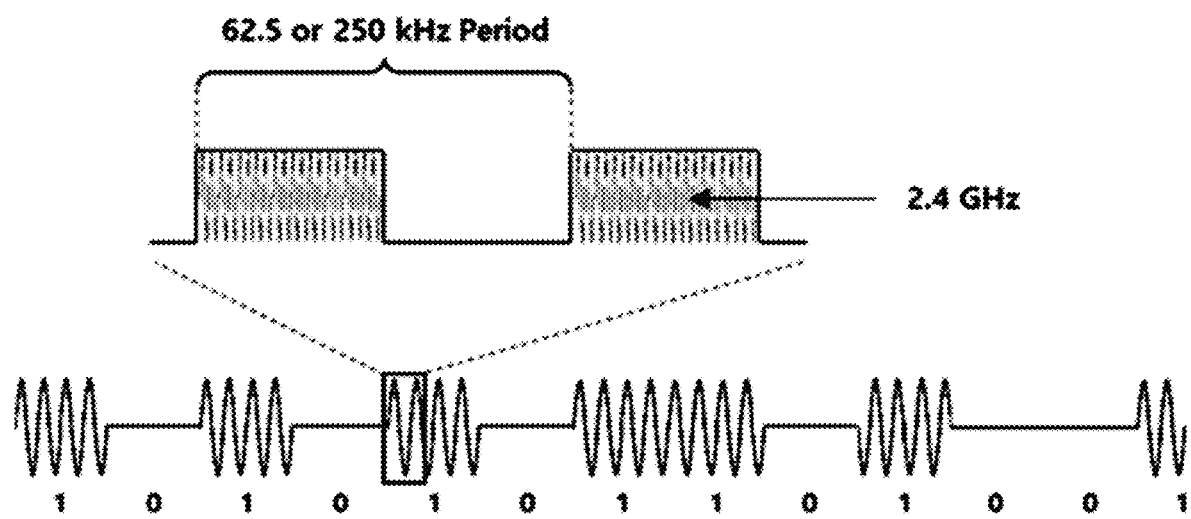
FIG. 6 illustrates a method of generating a wake-up signal using a carrier frequency according to an embodiment of the present disclosure.
Figure 7:
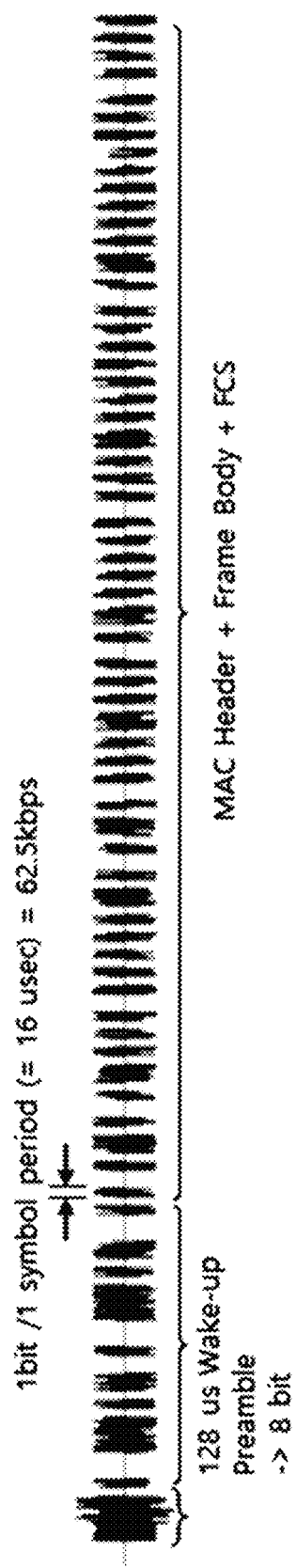
FIG. 7 is a waveform diagram of an exemplary wake-up signal in which a wave-up packet is modulated using a carrier frequency according to an embodiment of the present disclosure.
Figure 8:
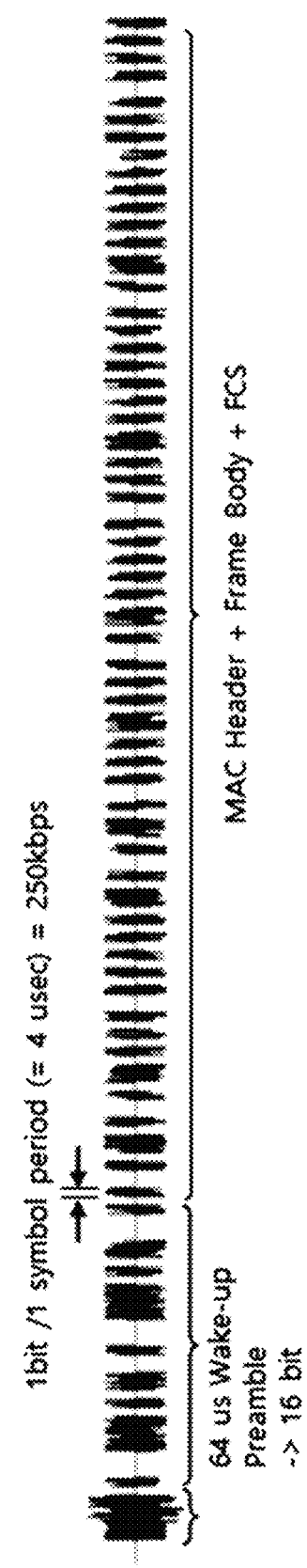
FIG. 8 is a waveform diagram of another exemplary wake-up signal in which a wave-up packet is modulated using another carrier frequency according to another exemplary embodiment of the present disclosure.

Next, methods of generating the wake-up signal according to embodiments of the present disclosure are described with reference to FIGS. 6 through 8. FIG. 6 illustrates a method of generating the wake-up signal using a carrier frequency according to an embodiment of the present disclosure. FIG. 7 is a waveform diagram of an exemplary wake-up signal in which the wave-up packet is modulated using a carrier frequency according to an embodiment of the present disclosure. FIG. 8 is a waveform diagram of another exemplary wake-up signal in which the wave-up packet is modulated using another carrier frequency according to another exemplary embodiment of the present disclosure.

First, a method of OOK modulating the payload P of the wake-up packet is described with reference to FIG. 6. Since the present embodiment utilizes the 2.4 GHz ISM band communications, the carrier frequency used by the main radio module 110 is 2.4 GHz. The main radio module 110 OOK modulates the payload P of the wake-up packet by representing each bit of the payload P of the wake-up packet by presence or absence of the carrier wave such that an envelope of a OOK modulated wake-up signal coincides with the payload P of the wake-up packet. The wake-up packet may have a bit rate of 62.5 or 250 KHz which is a carrier frequency 2.4 GHz divided-by-n, but the present disclosure is not limited thereto.

The wake-up frame contains simple information for awakening a wake-up receiver (WUR), and can be transferred through a signal modulated at a relatively low speed. Accordingly, a synchronizing preamble for receiving and demodulating the OOK wake-up signal needs not to be long.

FIG. 7 illustrates an example of the wake-up signal in which a wake-up packet having a frequency of 62.5 kbps is OOK modulated. This wake-up packet is referred to as "wake-up packet SYNC1" in this specification. Because of its low frequency of 62.5 kbps, the wake-up packet SYNC1 allows stable performance of the system and is suitable for long distance communications and outdoor environments. One symbol length of the wake-up packet SYNC1 is 16 μsec (=1/62.5 kbps). Meanwhile, 128 μs of the wake-up preamble P1 is allowable in the total payload P of the wake-up packet, and thus the wake-up packet SYNC1 may include the wake-up preamble P1 of 8 bits.

FIG. 8 illustrates an example of the wake-up signal in which a wake-up packet having a frequency of 250 kbps is OOK modulated. This wake-up packet is referred to as "wake-up packet SYNC2" in this specification. Because of its higher frequency of 250 kbps, the wake-up packet SYNC2 shows higher spectral efficiency and is suitable for near field communications. One symbol length of the wake-up packet SYNC2 is 4 μsec (=1/250 kbps). Meanwhile, 64 μs of the wake-up preamble P1 is allowable in the total payload P of the wake-up packet, and thus the wake-up packet SYNC2 may include the wake-up preamble P1 of 16 bits.

Figure 9:
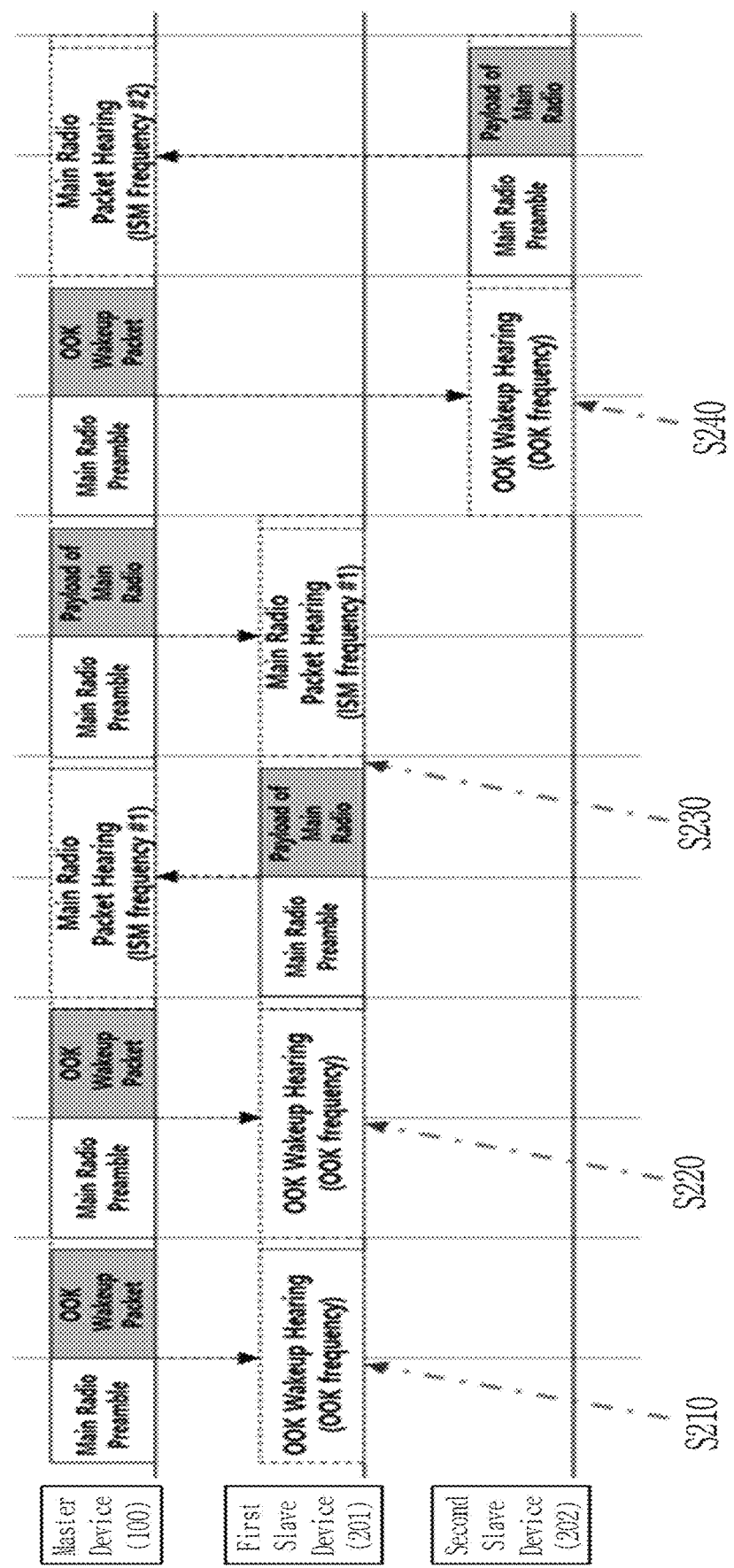
FIG. 9 illustrates a variable OOK signal-based RF wake-up communication method according to an exemplary embodiment of the present disclosure.

Next, a variable OOK signal-based RF wake-up communication method according to an embodiment of the present disclosure is described with reference to FIG. 9. FIG. 9 illustrates the variable OOK signal-based RF wake-up communication method according to an embodiment of the present disclosure. In the wake-up procedure illustrated in FIG. 9, a number of transmitting the wake-up packet is varied according to a distance and a required amount of power according to an exemplary embodiment.

In the case that there are a plurality of receiving IoT devices, the amount of required power and allowable distance for the low power communication unit 210 to awaken the controller 230 are different for each of the slave devices 200, that is, for each of the IoT devices. Thus, it is desirable that the master device 100 (e.g. the access point (AP) device) has information on the amount of required power for awakening each slave device 200, i.e. each IoT device. Also, in case where at least some of the slave devices 200 are located too far from the master device 100 to be awaken by a single wake-up packet, the master device 100 may need to transmit a plurality of packets depending on the distance between the master device 100 and the slave device 200.

Referring to FIG. 9, in operation S210, the controller 120 of the master device 100 transmits a first OOK modulated wake-up radio signal to the first slave device 201 through the main radio module 110. Here, it is assumed that the amount of power of the first OOK modulated wake-up radio signal received by the low power wake-up radio module 220 of the first slave device 201 is insufficient to demodulate the signal and awake the low power wake-up radio module 220. In such a case, the low power wake-up radio module 220 remains in the sleep mode.

In operation S220, the controller 120 of the master device 100 transmits a second OOK modulated RF wake-up radio signal to the first slave device 201 through the main radio module 110. Then, the low power wake-up radio module 220 of the first slave device 201 receives the second OOK modulated RF wake-up radio signal. Assuming that the second OOK modulated RF wake-up radio signal has sufficient power, the low power wake-up radio module 220 may wake up by the second OOK modulated RF wake-up radio signal. Accordingly, the low power wake-up radio module 220 generates the interrupt signal to wake up the controller 230.

In operation S230, in case that there exists any data that needs to be transmitted as a response from the first slave device 201 to the master device 100, the low power wake-up radio module 220 of the first slave device 201 transmits such data to the master device 100 through the main radio module 210. The main radio module 210 of the first slave device 201 may remain the sleep mode until there occurs the data that needs to be transmitted to the master device 100 and wake up after the data that needs to be transmitted to the master device 100 is generated.

In operation S240, the controller 120 of the master device 100 transmits a first OOK modulated RF wake-up radio signal to the second slave device 202 through the main radio module 110. If the first OOK modulated RF wake-up signal received by the second slave device 202 has sufficient power, the low power wake-up radio module 220 of the second slave device 202 can wake up at a time. The low power wake-up radio module 220 of the second slave device 202 may generate the interrupt signal to awaken the controller 230 of the second slave device 202. In case that there exists any data that needs to be transmitted to the master device 100, the low power wake-up radio module 220 of the second slave device 202 transmits such data to the master device 100. The main radio module 210 of the second slave device 202 may remain the sleep mode until there occurs the data that needs to be transmitted to the master device 100 and wake up after the data that needs to be transmitted to the master device 100 is generated.

Figure 10:
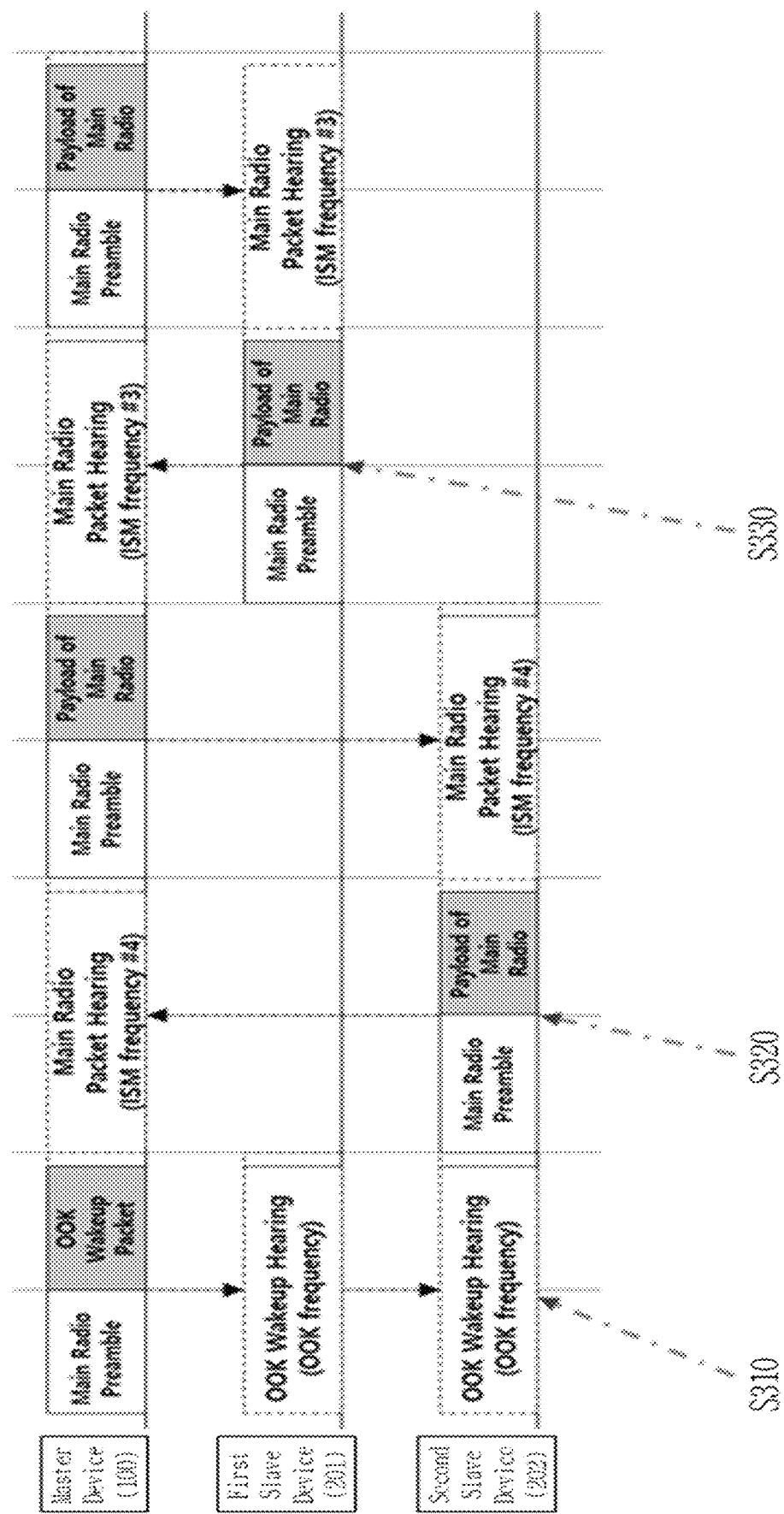
FIG. 10 illustrates the variable OOK signal-based RF wake-up communication method according to another exemplary embodiment of the present disclosure.

Next, the variable OOK signal-based RF wake-up communication method according to another embodiment of the present disclosure is described with reference to FIG. 10. FIG. 10 illustrates the variable OOK signal-based RF wake-up communication method according to another embodiment of the present disclosure.

In the embodiment shown in FIG. 10, the master device 100 transmits the wake-up radio signal to a plurality of slave devices 201 and 202 without designating the address specifying the slave device 200. After one or more of the plurality of slave devices 201, 202 wake up, the master device 100 and the awaken slave device 201 or 202 performs the communications under the control of the main radio module 110 of the master device 100.

Referring to FIG. 10, in operation S310, the controller 120 of the master device 100 transmits a first OOK modulated wake-up radio signal to an unspecified slave device 200 through the main radio module 110. At this time, it is assumed that the low power wake-up radio modules 220 of the first slave device 201 and the second slave device 202 receive the first OOK modulated wake-up radio signal. The low power wake-up radio modules 220 of the first slave device 201 and the second slave device 202 generates interrupt signals to awaken the controller 230 of respective slave device 201 and 202.

After the first slave device 201 and the second slave device 202 are awakened, the controllers 230 of the first slave device 201 and the second slave device 202 communicates with the master device 100 through the main radio module 210 by using a radio frequency in the ISM band allocated by a communication schedule arranged by the main radio module 110 of the master device 100.

For example, In response to the communication scheduling of the main radio module 110 of the master device 100, the low power wake-up radio module 220 of the second slave device 202 having been awaken by the first OOK modulated wake-up radio signal may communicate with the master device 100 as a first response for the first OOK modulated wake-up radio signal, in operation S320, according to the communication schedule arranged by the main radio module 110 of the master device 100.

The low power wake-up radio module 220 of the first slave device 201 may be awaken by the first OOK modulated RF wake-up packet along with the low power wake-up radio module 220 of the second slave device 202. However, the low power wake-up radio module 220 of the first slave device 201 may respond to the master device 100 later, in operation S330, because of its low priority designated in the communication schedule arranged by the main radio module 110 of the master device 100

The method according to exemplary embodiments of the present disclosure may be implemented in a form of a program readable by various computing devices and may be recorded in a computer-readable storage medium. Here, the storage medium may store program instructions, data files, data structures, and a combination thereof. The program instructions recorded on the storage medium may be those specifically designed and constructed for the present disclosure or may be those available to those skilled in the art of computer software. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, and the flash memory, erasable and programmable ROM (EPROM), and electrically erasable and programmable ROM (EEPROM), all of which are hardware devices suitable for storing the computer program instructions and data. The program instructions may be coded in, for example, a machine language or a high-level language that may be complied or interpreted by a compiler or an interpreter, respectively. The hardware device may be configured to operate similarly to one or more software modules to perform the operations required for the present disclosure, and vice versa.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A communication method, comprising:
transmitting, by a main radio module of a master device, an On-off keying (OOK) modulated wake-up radio signal by using a narrow frequency band between an Industrial, Scientific, and Medical (ISM) band and a guard band of the ISM band;
receiving, by a low power wake-up radio module of a slave device, the OOK modulated wake-up radio signal and demodulating the received OOK modulated wake-up radio signal according to an OOK modulation scheme and waking up a controller of the slave device from a sleep mode; and
when the controller of the slave device wakes up from the sleep mode, transmitting, by the controller of the slave device, data to be transmitted to the master device through the low power wake-up radio module of the slave device,
wherein the narrow frequency band comprises a frequency range having 5 MHz bandwidth below the ISM band and another frequency range having 5 MHz bandwidth above the ISM band,
wherein the narrow frequency band is divided into ten resource blocks each having 1 MHz bandwidth, and
wherein one resource block selected among the ten resource blocks is used for transmission of the OOK modulated wake-up radio signal.

2. The communication method of claim 1, wherein the OOK modulated wake-up radio signal comprises:
a preamble modulated according to a modulation scheme supported in a legacy communication system available in the ISM band of 2.4 GHz range; and
a payload P that is OOK modulated.

3. The communication method of claim 2, wherein the payload comprises:
a wake-up preamble indicating that a packet carried by the OOK modulated wake-up radio signal is a wake-up packet;
a MAC header containing an address of the slave device;
a frame body containing data to be delivered to the slave device; and
a frame check sequence containing a sequence for checking and integrity of the packet.

4. The communication method of claim 1, wherein the master device previously stores information on an amount of power required for awakening the slave device.

5. The communication method of claim 1, wherein the master device transmits the OOK modulated wake-up radio signal a plurality of times until the slave device wakes up.

6. The communication method of claim 1, wherein the master device transmits the OOK modulated wake-up radio signal to a plurality of slave devices without designating a specific slave device,
   wherein the plurality of the slave devices waking up by the OOK modulated wake-up radio signal communicate with the master device according to an order designated by a communication schedule arranged by the master device.

7. A master device for use in communications, comprising:
   a main radio module configured to communicate with a slave device; and
   a controller configured to control the main radio module to transmit an On-off keying (OOK) modulated wake-up radio signal by using a narrow frequency band between an Industrial, Scientific, and Medical (ISM) band and a guard band of the ISM band,
   wherein the narrow frequency band comprises a frequency range having 5 MHz bandwidth below the ISM band and another frequency range having 5 MHz bandwidth above the ISM band,
   wherein the narrow frequency band is divided into ten resource blocks each having 1 MHz bandwidth, and
   wherein one resource block selected among the ten resource blocks is used for transmission of the OOK modulated wake-up radio signal.

8. The master device of claim 7,
   wherein the wake-up radio signal comprises:
      a preamble modulated according to a modulation scheme supported in a legacy communication system available in the ISM band of 2.4 GHz range; and
      a payload P that is OOK modulated, and
   wherein the payload comprises:
      a wake-up preamble indicating that a packet carried by the wake-up radio signal is a wake-up packet;
      a MAC header containing an address of the slave device;
      a frame body containing data to be delivered to the slave device; and
      a frame check sequence containing a sequence for checking and integrity of the packet.

9. A slave device for use in communications, comprising:
   a slave radio module configured to communicate with a master device in an Industrial, Scientific, and Medical (ISM) band;
   a controller configured to communicate with the master device through the slave radio module when there is any data to be transmitted after waking up from a sleep mode; and
   a low power wake-up radio module configured to
      receive an OOK modulated wake-up radio signal transmitted by the master device by using a narrow frequency band between the ISM band and a guard band of the ISM band,
      demodulate the OOK modulated wake-up radio signal according to an OOK modulation scheme, and
      awaken the controller of the slave device from the sleep mode,
   wherein the narrow frequency band comprises a frequency range having 5 MHz bandwidth below the ISM band and another frequency range having 5 MHz bandwidth above the ISM band,
   wherein the narrow frequency band is divided into ten resource blocks each having 1 MHz bandwidth, and
   wherein one resource block selected among the ten resource blocks is used for transmission of the OOK modulated wake-up radio signal.

10. The slave device of claim 9,
   wherein the wake-up radio signal comprises:
      a preamble modulated according to a modulation scheme supported in a legacy communication system available in the ISM band of 2.4 GHz range; and
      a payload P that is OOK modulated, and
   wherein the payload comprises:
      a wake-up preamble indicating that a packet carried by the wake-up radio signal is a wake-up packet;
      a MAC header containing an address of the slave device;
      a frame body containing data to be delivered to the slave device; and
      a frame check sequence containing a sequence for checking and integrity of the packet.

* * * * *